United States Patent [19]
Rogers et al.

[11] Patent Number: 5,369,984
[45] Date of Patent: Dec. 6, 1994

[54] METHOD AND APPARATUS FOR TESTING OF TANK INTEGRITY OF VEHICLE FUEL SYSTEMS

[75] Inventors: John N. Rogers, Tucson, Ariz.; Rinaldo Tedeschi; Vincent J. Poracaro, both of Newington, Conn.

[73] Assignee: Environmental Systems Products, Inc., East Granby, Conn.

[21] Appl. No.: 114,505

[22] Filed: Aug. 31, 1993

[51] Int. Cl.⁵ .................................. G01M 3/32
[52] U.S. Cl. ............................................ 73/49.2
[58] Field of Search ............... 73/40, 49.2, 40.5 R

[56] References Cited
U.S. PATENT DOCUMENTS
4,575,807  3/1986  Dodge .................................. 73/40

*Primary Examiner*—Hezron E. Williams
*Assistant Examiner*—Michael J. Brock
*Attorney, Agent, or Firm*—Schweitzer Cornman & Gross

[57] ABSTRACT

A method and apparatus for testing vehicle fuel tank integrity determines the free space in the system by pressurizing the system with a known quantity of gas. The loss in pressure over a test period is then monitored. These data are used to calculate the size of the leak. Alternatively, the free volume is compared to a reference volume and a normalized leak rate computed for comparison to reference values.

7 Claims, 3 Drawing Sheets

PRESSURE DROP TABLE FOR REPAIR STATIONS
(FROM 28 INCHES OF WATER)

| GAS REQUIRED TO FILL TANK (GALS) | ALLOWED PRESSURE DROP (INCHES OF WATER) |
| --- | --- |
| NONE (FULL) | 26 |
| 1 | 20 |
| 2 | 16 |
| 3 | 13 |
| 4 | 11 |
| # 5 | # 10 |
| 6 | 9 |
| 7 | 8 |
| 8 | 7 |
| 9 | 6 |
| 10 | 6 |
| 15 | 4 |
| 20 | 3 |

STATE STANDARD

*FIG. 3*

METHOD AND APPARATUS FOR TESTING OF TANK INTEGRITY OF VEHICLE FUEL SYSTEMS

The present invention relates to a new and improved method and apparatus for conducting a test of a vehicle fuel tank and associated lines.

BACKGROUND OF THE INVENTION

The testing of the functional systems of automobiles, trucks and the like has progressed to a point that extremely sophisticated and detailed tests may be performed to insure both that the components of the vehicle are working properly from a mechanical and electromechanical point of view, and that system performance is in accordance with mandated guidelines, whether they be on the federal, state or local level. The federal Environmental Protection Administration (EPA), for example, has promulgated extensive regulations limiting the emissions of motor vehicles. The present technology allows a battery of tests to be performed by a test technician utilizing a computer controlled interface and analysis system which can provide essentially real time evaluation the vehicle parameters and components under test.

One area of particular concern is the vehicle fuel system. The loss of fuel through evaporation to the atmosphere from the fuel tank and associated piping is both wasteful, as well as being environmentally unsound, as the evaporated fuel, in addition to creating a possibly dangerous situation, contributes to unwanted hydrocarbon pollution. In an effort to curb such pollution and identify vehicles having defective fuel systems which can allow for the loss of fuel, the EPA has proposed a pressure test to determine fuel tank integrity. The test consists of pressurizing the tank and associated vapor lines leading to the vapor capture canister to determine if they are capable of holding pressure and thus are free of leaks. The test is performed by sealing the vent line from the fuel tank at the charcoal canister and pressurizing the tank and lines with nitrogen. The rate of pressure loss over two minutes is then measured.

This test protocol, while able to qualitatively identify the integrity of the fuel system, provides little in the way of a quantitative analysis. It is accordingly the purpose of the present invention to provide a pressure test procedure which addresses the problem of variation in the volume of the evaporative system being tested. When a tank is pressurized to a given pressure, the rate of leak is proportional to the volume of gas being vented. The difference in volume in the available vapor space in a full and empty gas tank may exceed a factor of 10. Thus, the same size leak can give a ten times faster pressure decay with a full tank as with an empty tank. The present invention allows the free volume of the tank to be considered and allows a quantitative determination of the size of leak, a determination not addressed by the present procedure.

BRIEF DESCRIPTION OF THE INVENTION

In accordance with the foregoing, the present invention comprises a method and apparatus for pressurizing the available vapor space of the tank and fuel lines while monitoring the flow rate of the pressurizing gas. This allows calculation of the free or vapor space volume of the system to be made. After pressurization to a chosen reference value any loss of pressure is measured on a continuing basis over a chosen test interval. The free space and pressure decay values can then be used to associate the actual pressure drop to reference standard values, which define the acceptable limits. Alternatively, the collected data are utilized to calculate the actual amount of gas escaping through the leak and thus the true size of the leak.

BRIEF DESCRIPTION OF THE DRAWINGS

A fuller understanding of the present invention will be accomplished upon consideration of the following description of referred, but nonetheless illustrative embodiments of the invention, when reviewed in conjunction with the annexed drawings, wherein:

FIG. 3 is a typical conversion chart associating various free volumes to a "standard" leak rate.

BRIEF DESCRIPTION OF THE INVENTION

Figure 1:
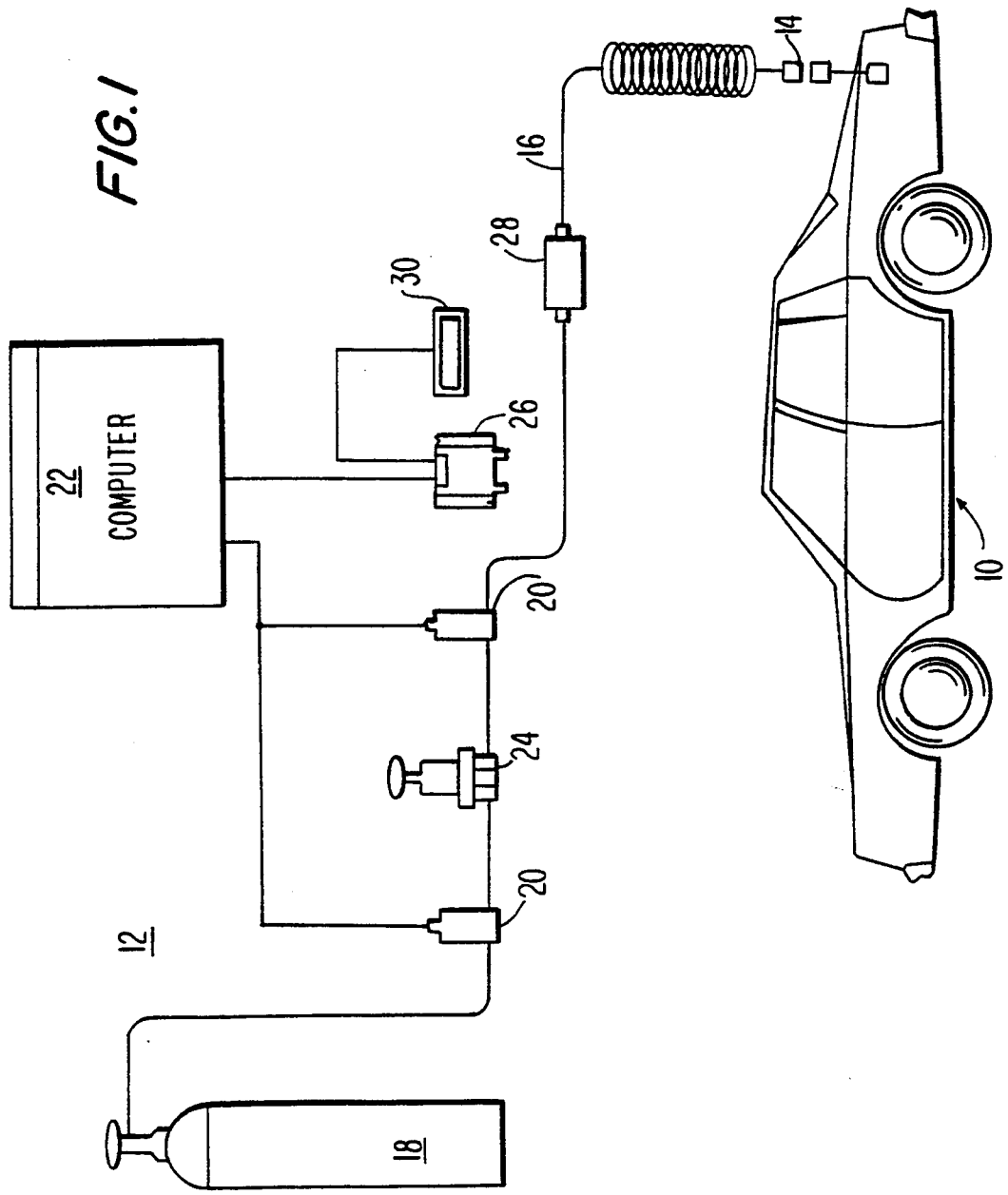
FIG. 1 is a schematic representation of the apparatus utilized in the invention.

Referring to FIG. 1, an automobile 10 whose fuel tank system is to be tested is connected to the test apparatus 12 by an adapter 14. The line running from the fuel tank to the fuel vapor recovery canister is first located and identified, the test technician pinching or otherwise sealing the line to isolate the canister from the line. The adapter is then connected to the fuel tank filler neck. The adapter may be in the form of a locking member which seals the test hose 16 to the filler neck, utilizing the flanges provided for the tank filler cap. Alternatively, the fuel vapor recovery canister line can be disconnected from the canister and connected to the hose by an adapter designed for such interconnection. In such a case the vehicle fuel cap is then inspected to insure that it is properly tightened down on the fuel filler line neck.

The test apparatus 12 comprises a source of a pressurizing gas 18, such as helium or nitrogen. The gas is metered through one or more solenoid-operated valves 20, the operation of which are controlled by processor 22. Typically, the processor 22 may be of the microprocessor variety, such as a "personal computer" system, comprising part of an integrated vehicle test apparatus capable of performing a variety of tests and procedures to the various vehicle systems. The pressurizing gas is pressure regulated by precision regulator 24, a pressure transducer and transmitter 26 being located downstream of the regulator to provide an appropriate monitoring output signal to the processor 22. An electronic flowmeter 28 monitors the volume of pressuring gas being supplied to the automotive fuel system under test, and transmits appropriate data to the processor. A digital readout 30 may be provided to provide a visual display of the volume.

The instantaneous loss of gas through a leak, measured in volume per minute, is related to the size of the leak by the following equation:

$$Q_L = S_L \sqrt{\frac{(P^2 - P^2)}{SG * T}}$$

Where $Q_l$ is the leak rate, $S_L$ is the size of the leak, SG is the specific gravity of the gas and T is the absolute temperature of the gas $P_1 - P_2$ is the pressure drop experienced by the leak.

For a given size leak, the leak flowrate is proportional to the pressure difference across the leak orifice ($P_1 - P_2$). The pressure within the fuel system, however, will vary in proportion to the volume of pressurizing gas therein. The greater the volume to be accommodated by the pressurizing gas, the lower the pressure for a given mass of gas supplied. The vapor space pressurized during the test consists of the pressurizing gas supply lines, the vapor space in the fuel tank, and the vapor vent lines to the canister. In a typical system, the supply line to the filler neck would be a ⅜ inch inner diameter hose of about 25 feet in length. This equates to a volume of 0.5 liters. The volume of the fuel vapor lines are negligible. The largest volume is the vapor space in the fuel tank. This can vary from approximately 3 liters for a tank filled with fuel to 60 liters for an empty tank. The relationship between volume and pressure decay rate indicates that a twenty-fold difference in vapor volume equates to a twenty-fold difference in the rate of pressure decay.

Typical standards for determining the integrity of a fuel tank system call for the system to have a pressure decay rate below a given value, such as a drop from 14±½ inches water to not below 8 inches over a two minute interval. Since such standards do not take into account the free volume of the system under test, they are of limited value.

In a first embodiment of the invention, the tank free volume is converted to an equivalent "standard" volume, which allows the measured leak rate to be similarly standardized and thus compared to established guidelines. A typical half-full gas tank volume of 21 liters may be taken as the standard. The actual volume of the free space in the fuel system under test can be determined by reference to the flow of the pressurizing gas by the following formula:

$$V = K_1 * F_T / (P_1 - P_2)$$

Where V is the volume of the free space in the system; $K_1$ is a proportionality constant for the test gas; and $F_T$ is the total amount or mass of test gas used to pressurize the system.

With the fuel tank pressurized to a chosen level, typically about 28 inches of water, the pressure is monitored over a chosen time interval, typically two minutes, and a decay curve determined. With the ratio of actual free space to the "standard" free space being known, the actual leak rate can be converted to an equivalent leak rate for the standard tank volume. In practice data of the type depicted in FIG. 2, including a decay curve for the "standard volume", may be utilized to develop a leak rate adjustment factor for different ratios of free volume. This data can be conveniently stored in appropriate memory devices utilized in association with the computer systems with which the present invention is preferably utilized. The conversion data may alternatively be in the form of a chart, associating the free volume (in the form of "gas[oline] required to fill tank") to a pressure drop equivalent to the allowed drop for the "standard". Such a reference chart is depicted in FIG. 3.

Figure 2:
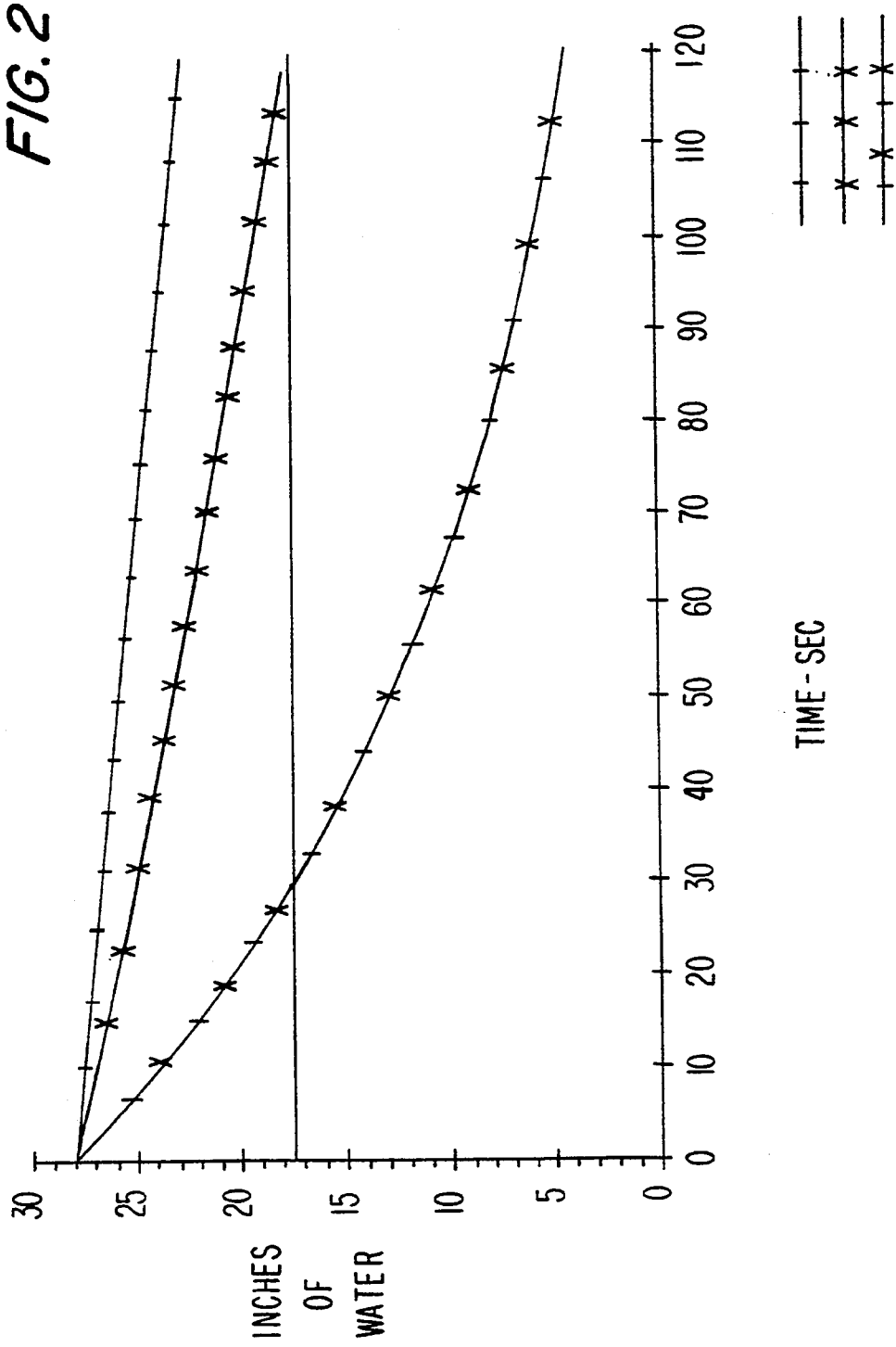
FIG. 2 is a graphical depiction of decay curves for a given leak in a fuel tank with varying free volume.

An appreciable leak may cause pressurizing gas to be lost during the fill procedure. The volume calculation can be modified to allow for this loss factor. In particular, the slope at any point along a decay curve, such as those depicted in FIG. 2, represents the instantaneous rate of loss at the associated tank pressure. By applying this data to the pressure-time curve for the fill process, a correction to the volume of gas actually pressurizing and remaining in the tank can be made. Appropriate algorithms, known to those skilled in the art, can be employed to determine and apply the varying slope of the decay curve over the duration of the fill process.

In a second embodiment of the invention, the size of the leak, rather than a standardized leak rate, is determined. For a given gas at ambient temperature, leak size can be calculated by the following:

$$S_L = K_2 * V * \int \frac{dp_x}{\sqrt{(P_x^2 - P_o^2)}};$$

Where $dp_x$ is the time differential of pressure in the system, $P_x$ is the instantaneous pressure in the system and $P_o$ the ambient pressure.

The volume of the free space in the tank is computed from the gas flow information. Pressure decay readings are taken on a continuous basis and are integrated in accordance with the above formula to calculate the amount of vapor escaping through the leak. The size of the leak can then be determined.

The equipment utilized to perform the test may be of a conventional nature. A Sierra mass flow meter, model 830-M-1-SP, having a range of 0–10 1/min provides appropriate response and accuracy. Such a unit typically offers a 0–5 volt dc output. To provide the necessary accuracy at low flow rates, it may be desirable to perform a flow-output check at various known rates to generate a calibration curve. The calibration data may be stored by appropriate storage means associated with processor 22 and accessed as known in the art during computation.

The results of the testing procedure may be displayed on a video screen typically utilized with the processor 22, and can be stored and/or printed out as part of a complete engine and fuel system analysis. Depending on leak limits which may be established, the processor may be programmed to provide a pass/fail indication in addition or in lieu of the display of a specific leak rate.

We claim:

1. A method for testing the integrity of a vehicle fuel system comprising a tank, vapor capture canister and associated piping lines having a free space of unknown volume, comprising the steps of:
    isolating the tank from the canister;
    pressurizing the tank to a chosen pressure with a known mass of gas from a gas source;
    isolating the tank from the gas source;
    calculating the volume of the free space with reference to the mass of gas and chosen pressure;
    recording the instantaneous pressure of the gas within the tank on a repetitive basis over a chosen test interval commencing at the time of tank isolation;
    designating a known volume free space as a standard volume; and
    converting the recorded instantaneous pressure values to a standardized pressure decay rate by applying thereto a factor derived from the ratio between the free space volume and the standard volume.

2. The method of claim 1, wherein said recording step is performed on a continuous basis over the chosen test interval.

3. The method of claim 1, wherein said pressurizing step is performed with nitrogen as the gas.

4. The method of claim 1, wherein said step of pressurizing the gas tank is monitored by a computer processor.

5. The method of claim 1, wherein said step of pressurizing the tank comprises the step of connecting said gas source to a fuel filler neck of the tank.

6. The method of claim 1, wherein said step of pressurizing the tank comprises the step of connecting the gas source to a line between the tank and vapor capture canister.

7. An apparatus for testing the integrity of a vehicle fuel system having a free space of undetermined volume, a tank vapor capture canister and associated piping, comprising: a pressurized gas source adapted to be connected to said vapor space; means for measuring the mass of pressurizing gas injected into said vapor space; means for monitoring the pressure of said gas space during a test period; means for accepting reference data representing a chosen volume free space as a standard volume; and means for calculating a standardized leak rate for the fuel system utilizing said reference data and said gas mass and pressure data.

* * * * *